(12) United States Patent
Dlugoss et al.

(10) Patent No.: US 9,829,090 B2
(45) Date of Patent: Nov. 28, 2017

(54) TRANSMISSION FLUID CONTROL SYSTEMS AND METHODS FOR ENGINE AUTO-STOPS

(71) Applicant: GM Global Technology Operations LLC, Detroit, MI (US)

(72) Inventors: Randall B. Dlugoss, Royal Oak, MI (US); Karl Andrew Sime, Mason, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 95 days.

(21) Appl. No.: 14/633,533

(22) Filed: Feb. 27, 2015

(65) Prior Publication Data

US 2016/0176404 A1 Jun. 23, 2016

Related U.S. Application Data

(60) Provisional application No. 62/096,003, filed on Dec. 23, 2014.

(51) Int. Cl.
| | |
|---|---|
| *B60W 20/00* | (2016.01) |
| *F16H 61/00* | (2006.01) |
| *B60W 20/40* | (2016.01) |
| *B60W 30/192* | (2012.01) |
| *B60W 30/18* | (2012.01) |
| *B60W 30/20* | (2006.01) |

(52) U.S. Cl.
CPC ..... *F16H 61/0025* (2013.01); *F16H 61/0021* (2013.01); *B60W 20/40* (2013.01); *B60W 30/181* (2013.01); *B60W 30/192* (2013.01); *B60W 2030/206* (2013.01); *F16H 2312/14* (2013.01); *F16H 2312/20* (2013.01)

(58) Field of Classification Search
None
See application file for complete search history.

(56) References Cited

U.S. PATENT DOCUMENTS

| 4,291,595 A * | 9/1981 | Jelaca | F16H 61/0276 477/156 |
|---|---|---|---|
| 4,603,603 A * | 8/1986 | Salmon | F16H 61/0206 475/132 |
| 5,154,267 A * | 10/1992 | Watts | B60W 10/18 192/220 |
| 2011/0077830 A1* | 3/2011 | Lochocki, Jr. | B60W 10/02 701/68 |
| 2012/0310467 A1* | 12/2012 | Faucett | G07C 5/0808 701/29.8 |

* cited by examiner

*Primary Examiner* — Robert A Siconolfi
*Assistant Examiner* — Ryan Dodd

(57) ABSTRACT

A regulator valve regulates pressure of transmission fluid applied to a clutch of a transmission and a flow rate of the transmission fluid from the regulator valve to a transmission fluid sump. A transmission fluid pump is driven by an engine of the vehicle. A control module, while an ignition system of the vehicle is ON, selectively shuts down the engine of the vehicle for an auto-stop event. A target pressure module, before an engine speed reaches zero for the auto-stop event, increases a target value of a pressure of the transmission fluid at an output of the transmission fluid pump. A regulator control module, before the engine speed reaches zero for the auto-stop event and based on the increase in the target value of the pressure, adjusts the regulator valve to increase the pressure of the transmission fluid at the output of the transmission fluid pump.

20 Claims, 4 Drawing Sheets

TRANSMISSION FLUID CONTROL SYSTEMS AND METHODS FOR ENGINE AUTO-STOPS

CROSS-REFERENCE TO RELATED APPLICATIONS

This application claims the benefit of U.S. Provisional Application No. 62/096,003, filed on Dec. 23, 2014. The disclosure of the above application is incorporated herein by reference in its entirety.

FIELD

The present disclosure relates to vehicle transmissions and more particularly to transmission fluid pressure control systems and methods.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine generates torque and outputs torque to a transmission. An automatic transmission of a vehicle may include a plurality of fluid controlled friction coupling elements, such as clutches. A control module may engage and disengage the friction coupling elements to establish different gear ratios (also called speed ratios) within the transmission.

The transmission includes a transmission fluid pump. The transmission fluid pump provides transmission fluid for applying the clutches of the transmissions, lubricating transmission components, and cooling transmission components. Some transmission fluid pumps are mechanically driven, such as by the engine. Other transmission fluid pumps are electrically driven.

SUMMARY

In a feature, a vehicle control system is disclosed. A regulator valve regulates pressure of transmission fluid applied to a clutch of a transmission and a flow rate of the transmission fluid from the regulator valve to a transmission fluid sump. A transmission fluid pump is driven by an engine of the vehicle, draws the transmission fluid from the transmission fluid sump, and pumps the transmission fluid to the regulator valve. A control module, while an ignition system of the vehicle is ON, selectively shuts down the engine of the vehicle for an auto-stop event. A target pressure module, before an engine speed reaches zero for the auto-stop event, increases a target value of a pressure of the transmission fluid at an output of the transmission fluid pump. A regulator control module, before the engine speed reaches zero for the auto-stop event and based on the increase in the target value of the pressure, adjusts the regulator valve to decrease a flow rate of the transmission fluid from the regulator valve to the transmission fluid sump and increase the pressure of the transmission fluid at the output of the transmission fluid pump.

In further features, a maximum pressure module that sets a maximum pressure at the output of the transmission fluid pump for the auto-stop event, wherein the target pressure module, before the engine speed reaches zero for the auto-stop event, increases the target value of the pressure to the maximum pressure.

In further features, the maximum pressure module determines the maximum pressure based on the engine speed.

In further features, the target pressure module increases the target value of the pressure toward the maximum pressure at a predetermined rate.

In further features, the target pressure module begins increasing the target value of the pressure after receiving a signal indicative of the auto-stop event from the control module.

In further features, the target pressure module begins increasing the target value of the pressure when a predetermined condition is satisfied after receiving the signal indicative of the auto-stop event from the control module.

In further features, the target pressure module begins increasing the target value of the pressure a predetermined period after receiving the signal indicative of the auto-stop event from the control module.

In further features, the target pressure module begins increasing the target value of the pressure when the engine speed becomes less than a predetermined speed after receiving the signal indicative of the auto-stop event from the control module.

In further features, a pump control module increases an output of the transmission fluid pump based on the increase in the target value of the pressure.

In further features, the pump control module increases a displacement of the transmission fluid pump based on the increase in the target value of the pressure.

In a feature, a vehicle control method is disclosed. The vehicle control method includes: regulating pressure of transmission fluid applied to a clutch of a transmission and a flow rate of the transmission fluid from a regulator valve to a transmission fluid sump; using a transmission fluid pump that is driven by an engine of the vehicle: drawing the transmission from the transmission fluid sump; and pumping the transmission fluid to the regulator valve. The vehicle control method further includes: while an ignition system of the vehicle is ON, selectively shutting down the engine of the vehicle for an auto-stop event; before an engine speed reaches zero for the auto-stop event, increasing a target value of a pressure of the transmission fluid at an output of the transmission fluid pump; and before the engine speed reaches zero for the auto-stop event and based on the increase in the target value of the pressure, adjusting the regulator valve to: decrease a flow rate of the transmission fluid from the regulator valve to the transmission fluid sump; and increase the pressure of the transmission fluid at the output of the transmission fluid pump.

In further features, the vehicle control method further includes: setting a maximum pressure at the output of the transmission fluid pump for the auto-stop event; and before the engine speed reaches zero for the auto-stop event, increasing the target value of the pressure to the maximum pressure.

In further features, the vehicle control method further includes determining the maximum pressure based on the engine speed.

In further features, the vehicle control method further includes increasing the target value of the pressure toward the maximum pressure at a predetermined rate.

In further features, the vehicle control method further includes beginning to increase the target value of the pressure after receiving a signal indicative of the auto-stop event from a control module via a car area network (CAN) bus.

In further features, the vehicle control method further includes beginning to increase the target value of the pressure when a predetermined condition is satisfied after receiving the signal indicative of the auto-stop event from the control module.

In further features, the vehicle control method further includes beginning to increase the target value of the pressure a predetermined period after receiving the signal indicative of the auto-stop event from the control module.

In further features, the vehicle control method further includes beginning to increase the target value of the pressure when the engine speed becomes less than a predetermined speed after receiving the signal indicative of the auto-stop event from the control module.

In further features, the vehicle control method further includes increasing an output of the transmission fluid pump based on the increase in the target value of the pressure.

In further features, the vehicle control method further includes increasing a displacement of the transmission fluid pump based on the increase in the target value of the pressure.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine generates drive torque for a vehicle. A transmission transfers torque to one or more wheels of the vehicle. A transmission fluid pump pumps transmission fluid from a transmission fluid source (e.g., a sump). One or more regulator valves regulate transmission fluid flow to clutches and transmission fluid flow back to the transmission fluid source. A transmission control module (TCM) controls actuation of the regulator valve(s).

An engine control module (ECM) controls torque output of the engine based on one or more driver inputs. The ECM generally starts and shuts down the engine in response to user input to start and shut down the engine, respectively. The ECM also shuts down the engine for auto-stop events and starts the engine for auto-start events performed automatically without the driver requesting that the engine be shut down or later re-started.

The ECM disables fueling of the engine for an auto-stop event so the engine can slow to a stop. In various implementations, one or more generators of electrical power may be controlled to apply a torque load on the engine to slow the engine to a stop within a predetermined period during auto-stop events. In other implementations, the engine may slow to a stop within the predetermined period during auto-stop events without a torque load from a generator.

According to the present disclosure, the TCM decreases transmission fluid flow from the regulator valve(s) to the transmission fluid source during auto-stop events. This increases pressure at an output of a transmission fluid pump, thereby increasing resistance imposed on the engine by the transmission fluid pump and increasing a torque load on the engine. The increased torque load imposed on the engine by the transmission during-auto-stop events enables a less costly electrical power generator to be implemented and increases damping, which decreases noise and/or vibration experienced within a passenger cabin during the auto-stop events. Increasing the torque load imposed on the engine by the transmission during auto-stop events may also provide a fuel efficiency increase as the transmission fluid will be warmed during the auto-stop events and may therefore be warmer at subsequent auto-start events. Torque losses associated with the transmission fluid may decrease as the transmission fluid temperature increases. As such, the warming provided during auto-stop events may provide a fuel efficiency increase based on the decreased torque losses for later auto-start events of the engine.

Figure 1:
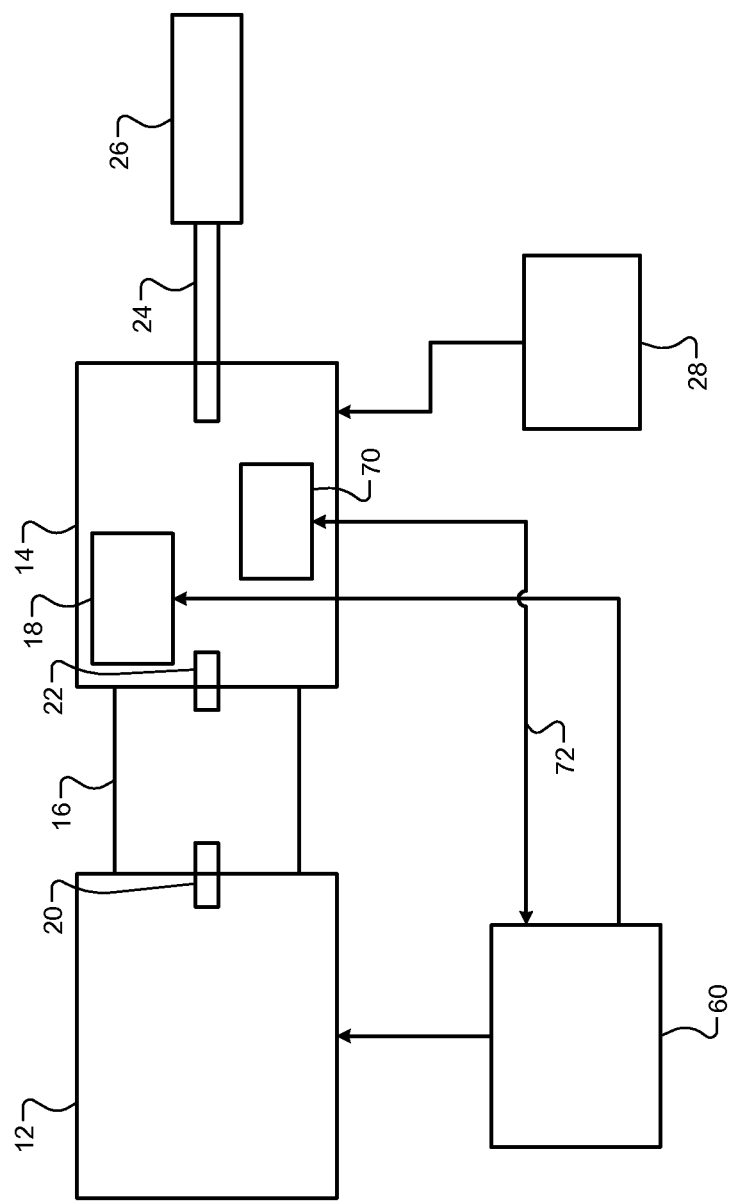
FIG. 1 is a functional block diagram of an example vehicle system.

Referring now to FIG. 1, a functional block diagram of an example vehicle system is presented. An internal combustion engine 12 drives a transmission 14 via a torque converter 16. The engine 12 may include, for example, a spark-ignition engine, a compression-ignition engine, or another suitable type of engine. A vehicle may also include one or more electric motors and/or motor generator unit (MGUs), such as MGU 18.

The engine 12 outputs torque to a pump side of the torque converter 16 via an engine output shaft 20, such as a crankshaft. An impeller side of the torque converter 16 supplies torque to the transmission 14 via a transmission input shaft 22. The electric motor(s) and/or MGU(s) may also output torque to the transmission input shaft 22 or to the torque converter 16 to supplement or replace engine torque output. A MGU may convert mechanical energy into electrical energy under some circumstances, for example, to recharge one or more batteries and/or to supply power for electronic components of the vehicle.

The transmission 14 includes one or more gear sets (not shown) for transferring between the transmission input shaft 22 and a transmission output shaft 24. A gear ratio may refer to the ratio between the rotational speed of the transmission input shaft 22 and the rotational speed of the transmission output shaft 24. The transmission output shaft 24 drives a driveline 26, and the driveline 26 transfers torque to wheels (not shown) of the vehicle. A range selector 28 enables a user to select a mode of operation of the transmission 14. The mode may include, for example, a park mode, a reverse mode, a neutral mode, or one or more forward drive modes.

An engine control module (ECM) 60 controls the engine 12. For example, the ECM 60 controls starting of the engine 12 and shutting down of the engine 12. The ECM 60 starts the engine 12 using a starter motor in response to user input to start the engine 12, for example, via an ignition button, switch, or key. The ECM 60 shuts down the engine 12 in response to user input to shut down the engine, for example, via the ignition button, switch, or key. The ECM 60 or another control module (not shown) may control operation of one or more electric motors and/or MGUs in various implementations. While the example of the ECM 60 controlling starting, shut down, and fueling of the engine 12 is shown and discussed, another control module (e.g., a hybrid control module) or a combination of the other control module and the ECM 60 may control starting, shut down, and fueling of the engine 12.

In addition to user requested starting and shutting down of the engine 12, the ECM 60 also controls auto-stop/start events of the engine 12. An auto-stop event includes shutting down the engine 12 when one or more predetermined enabling criteria is/are satisfied and the driver has not requested that the engine 12 be shutdown (e.g., while the ignition system is in an ON state). During an auto-stop event, the ECM 60 shuts down the engine 12 and disables the provision of fuel to the engine 12, for example, to increase fuel economy (by decreasing fuel consumption). An auto-stop event may be performed, for example, when the vehicle is stopped and a brake pedal is applied. Auto-stop events may also be performed while the vehicle is moving and the brake pedal is applied, when the driver has released an accelerator pedal, and/or other suitable instances.

While the engine 12 is shut down for an auto-stop event, the ECM 60 may selectively perform an auto-start event when one or more predetermined enabling criteria is/are satisfied. An auto-start event may include, for example, enabling fueling, enabling the provision of spark, engaging the starter motor with the engine 12, and applying current to the starter motor to start the engine 12. The ECM 60 may perform an auto-start event, for example, when the driver releases the brake pedal.

A transmission control module (TCM) 70 controls operation of the transmission 14. While the TCM 70 is shown as being implemented within the transmission 14, the TCM 70 may be implemented externally to the transmission 14 in various implementations. The ECM 60 and the TCM 70 may share data via a connection 72, such as a car area network (CAN) bus. One example of data that may be shared between the ECM 60 and the TCM 70 that is discussed further below includes data regarding an auto-stop event of the engine 12.

Figure 2:
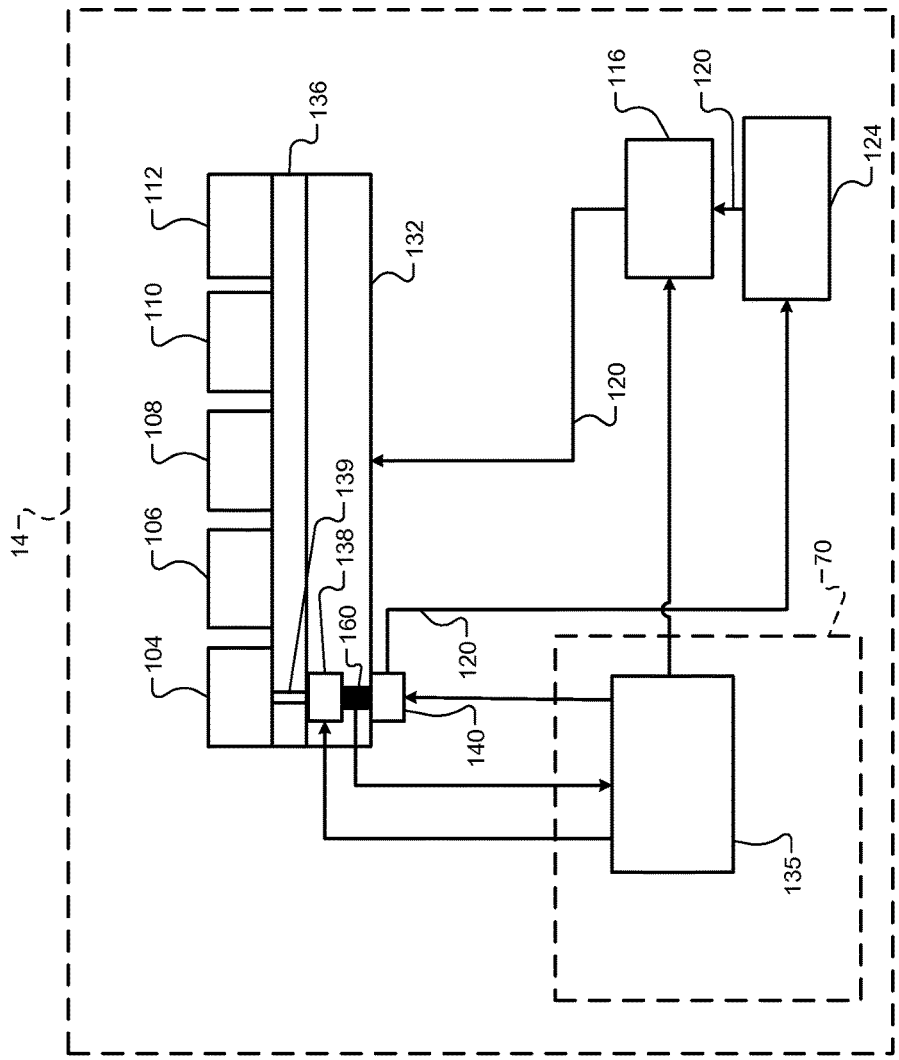
FIG. 2 is a functional block diagram of an example transmission system.

Referring now to FIG. 2, a functional block diagram of an example implementation of a transmission system is presented. The transmission 14 includes a plurality of friction coupling elements, such as first, second, third, fourth, and fifth clutches 104, 106, 108, 110, and 112, respectively. The transmission 14 may include a greater or fewer number of clutches and/or friction coupling elements.

The friction coupling elements control which one of the gear sets is engaged within the transmission 14 at a given time. Different gear ratios may be established when different combinations of one or more of the friction coupling elements and gear sets are engaged.

Transmission fluid 120 is directed to and from the friction coupling elements to control engagement and disengagement of the friction coupling elements. A transmission fluid pump 116 draws the transmission fluid from a sump 124 or another suitable transmission fluid source. The transmission fluid pump 116 pressurizes the transmission fluid and provides pressurized transmission fluid to a valve body 132. The transmission fluid pump 116 may also provide pressurized transmission fluid to the torque converter 16 and/or one or more other components.

The transmission fluid pump 116 may also output transmission fluid for lubrication of one or more transmission components and for cooling of one or more transmission components, such as one or more electric motors and/or MGUs. The transmission 14 may include a transmission fluid cooler (not shown) that transfers heat from transmission fluid flowing through the transmission fluid cooler to a cooling medium, such as air or coolant.

The transmission fluid pump 116 is a mechanical transmission fluid pump that is driven mechanically by the engine 12. While the present application will be shown and discussed in terms of the transmission fluid pump 116 being a mechanical, fixed displacement transmission fluid pump, the present application is also applicable to variable displacement transmission fluid pumps including binary, ternary, and quaternary transmission fluid pumps.

The valve body 132 includes one or more control elements, such as clutch control solenoid 138, that control the flow of the transmission fluid from the valve body 132 to ones of the friction coupling elements and vice versa. The transmission fluid flows between the valve body 132 and ones of the friction coupling elements via passages, such as passages formed in a housing 136 of the transmission 14. For example only, the clutch control solenoid 138 may control the flow of the transmission fluid 120 between the valve body 132 and the first clutch 104 via passage 139. One or more clutch control solenoids and passages may be provided for each of the friction coupling elements.

A regulator valve 140 controls the flow of the transmission fluid from the valve body 132 (at a relatively higher pressure) back to the sump 124 (at a relatively lower pressure). By controlling the flow of the transmission fluid back to the sump 124, the regulator valve 140 also controls the pressure of the transmission fluid input to the control solenoids and the friction coupling elements. For example only, the regulator valve 140 controls the pressure of the transmission fluid 120 input to the clutch control solenoid 138 and the first clutch 104. The regulator valve 140 may control the pressure of the transmission fluid 120 input to all of the clutch control solenoids. While the present application will be discussed using this example implementation, multiple regulator valves may be included to control the pressure of the transmission fluid input to subsets of one or more of the clutch control solenoids.

The transmission 14 may include one or more pressure sensors. For example only, a line pressure sensor 160 may measure a pressure of the transmission fluid input to the clutch control solenoids. This pressure will be referred to as a line pressure. The TCM 70 controls the regulator valve 140 to adjust the line pressure toward a target line pressure. The transmission 14 includes one or more other sensors, such as one or more transmission fluid temperature sensors, one or more speed sensors, and/or one or more other suitable sensors.

Figure 3:
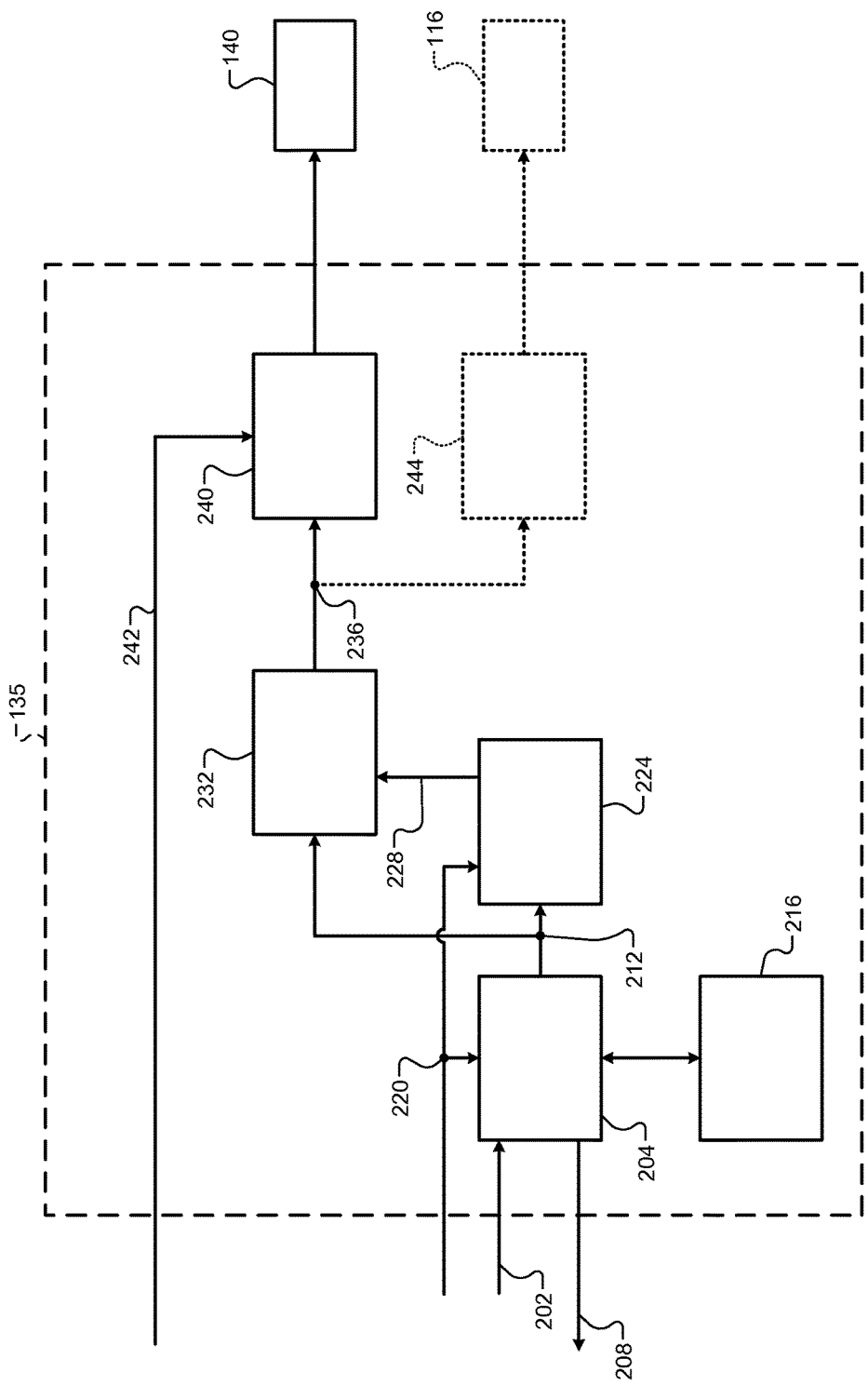
FIG. 3 is a functional block diagram of an example line pressure control system.

Referring now to FIG. 3, a functional block diagram of an example line pressure control system is presented. The line pressure control module 135 may be implemented independently, within the TCM 70, or within another suitable module. The ECM 60 communicates an auto-stop signal 202 to the line pressure control module 135 for an auto-stop event of the engine 12. The ECM 60 may transmit the auto-stop signal 202, for example, when the ECM 60 begins shutting down the engine 12 for an auto-stop event or a predetermined period before beginning to shut down the engine 12 for the auto-stop event. The auto-stop signal 202 therefore indicates that the ECM 60 will shut down or is in the process of shutting down the engine 12 for an auto-stop event. The ECM 60 may transmit the auto-stop signal 202 for each auto-stop event.

When a triggering module 204 receives the auto-stop signal 202, the triggering module 204 determines whether transmission assistance can be used for the auto-stop. For example, the triggering module 204 may determine that transmission assistance can be used when no faults have been diagnosed in the TCM 70 and the line pressure sensor 160. In various implementations, the line pressure sensor 160 may be omitted. When transmission assistance can be used for an auto-stop event, the triggering module 204 may transmit an acknowledgement signal 208 to the ECM 60 to indicate that the transmission 14 will be used to apply a torque load on the engine 12 to slow the engine 12 for the auto-stop event. As discussed further below, the transmission 14 will increase a torque load on the engine 12 imposed by the transmission 14 during the auto-stop event.

The triggering module 204 selectively generates a trigger signal 212 when the auto-stop signal 202 is received. The triggering module 204 may generate the trigger signal 212 when one or more criteria are satisfied after the auto-stop signal 202 is received.

For example, the triggering module 204 may reset and start a timer value tracked by a timer module 216 when the auto-stop signal 202 is received. The timer value therefore tracks the period since the auto-stop signal 202 was received. The triggering module 204 may generate the trigger signal 212 when the timer value becomes greater than a predetermined value. In other words, the triggering module 204 may generate the trigger signal 212 a predetermined period (corresponding to the predetermined value) after the receipt of the auto-stop signal 202. Additionally or alternatively, the triggering module 204 may generate the trigger signal 212 when an engine speed 220 becomes less than a predetermined speed after the receipt of the auto-stop signal 202. The engine speed 220 is measured, for example, based on positions of a crankshaft of the engine 12 measured using a crankshaft position sensor (not shown). The engine speed 220 may be communicated by the ECM 60.

When the trigger signal 212 is generated, a maximum pressure module 224 determines a maximum line pressure 228 for the auto-stop event. The maximum line pressure 228 corresponds to a maximum value of the line pressure for the auto-stop event. In other words, the maximum line pressure 228 corresponds to a maximum value of the pressure of transmission fluid output from the regulator valve 140 to the clutch control solenoid(s) for the auto-stop event.

The maximum line pressure 228 may be a fixed predetermined pressure or a variable. in the case of a variable, the maximum pressure module 224 may determine the maximum line pressure 228, for example, based on the engine speed 220 when the auto-stop signal 202 is generated. The maximum pressure module 224 may determine the maximum line pressure 228, for example, using a function or a mapping that relates engine speeds to maximum line pressures. The maximum line pressure 228 may decreases as the engine speed 220 decreases, and vice versa.

A target line pressure module 232 sets a target line pressure 236. A regulator control module 240 controls the regulator valve 140 to achieve the target line pressure 236. The regulator control module 240 may control the regulator valve 140 in closed-loop, for example, based on a line pressure 242 measured using the line pressure sensor 160. In implementations including a variable displacement transmission fluid pump, a pump control module 244 may additionally control output of the transmission fluid pump 116 to achieve the target line pressure 236. For example, the pump control module 244 may increase a displacement of the transmission fluid pump 116 as the target line pressure 236 increases and vice versa.

The target line pressure module 232 may generally set the target line pressure 236 based on one or more operating parameters. When the trigger signal 212 is generated, the target line pressure module 232 increases the target line pressure 236 to the maximum line pressure 228. The target line pressure module 232 may, for example, ramp the target line pressure 236 up to the maximum line pressure 228 at a predetermined rate or increase the target line pressure 236 to the maximum line pressure 228 in another suitable manner.

As the target line pressure 236 increases, the regulator control module 240 closes the regulator valve 140 to restrict transmission fluid flow through the regulator valve 140 back to the sump 124. Restricting fluid flow through the regulator valve 140 back to the sump 124 increases the pressure of the transmission fluid applied to one or more of the control elements, thereby increasing a torque load imposed on the engine 12 by the transmission 14. More specifically, restricting fluid flow through the regulator valve 140 increases back pressure on the transmission fluid pump 116 and increasing the torque load imposed on the engine 12 by the transmission fluid pump 116.

This increased torque load on the engine 12 may help slow the engine 12 to a stop sooner during the auto-stop event than if the torque load was not increased. The transmission 14 also damps vibration experienced as the engine is shut down for the auto-stop event, thereby decreasing noise, vibration, and/or harshness experienced within a passenger cabin of the vehicle.

One or more electrical generators, such as an alternator or the MGU 18, may be controlled during auto-stop events to apply a torque load on the engine 12 and to stop the engine 12 within a predetermined period after auto-stop events begin. With the transmission 14 imposing a torque load on the engine 12 during auto-stop events, a less costly electrical generator (e.g., alternator or MGU 18) may be implemented since the electrical generator may be relied upon to a lesser extent to slow the engine 12 for auto-stop events.

Additionally, applying a torque load on the engine 12 during auto-stop events using the transmission 14 warms the transmission fluid. This heating leaves the transmission fluid warmer than it otherwise would have been when the engine 12 is next started pursuant to an auto-start event. The frictional losses attributable to the transmission fluid at the next auto-start event may therefore be lower due to the warming, which may provide a fuel efficiency increase. The target line pressure module 232 may decrease the target line pressure 236 from the maximum line pressure 228, for example, once the engine speed 220 reaches zero for the auto-stop event.

Figure 4:
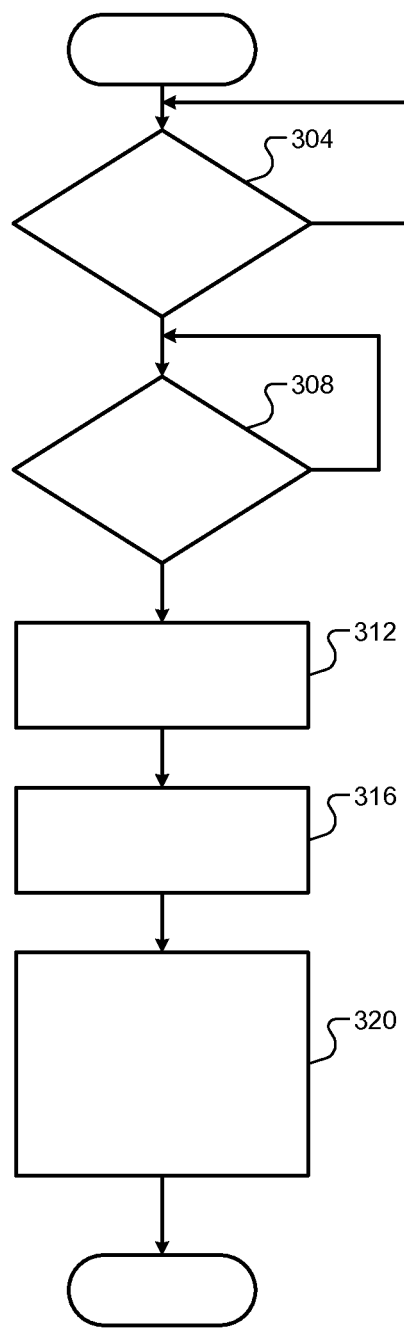
FIG. 4 is a flowchart depicting an example method of increasing transmission fluid line pressure to apply a torque load on an engine using a transmission for an auto-stop event of the engine.

Referring now to FIG. 4, a flowchart depicting an example method of increasing the line pressure to apply a torque load on the engine 12 using the transmission 14 for an auto-stop event of the engine 12 is presented. Control begins with 304 where the triggering module 204 determines whether the ECM 60 has generated the auto-stop signal 202. The ECM 60 may generate the auto-stop signal 202 before or when the ECM 60 begins to shut down the engine 12 for an auto-stop event of the engine 12. If 304 is true, control continues with 308. If 304 is false, control may remain at 304. The ECM 60 disables fueling of the engine 12 to allow the engine 12 to come to a stop for the auto-stop event. The ECM 60 may perform the auto-stop event, for example, when the brake pedal is depressed while the vehicle is stopped or when one or more other criteria for performing an auto-stop event are satisfied. While the engine 12 is slowing for the auto-stop event, the ECM 60 may increase a torque load applied by an electrical generator, such as the MGU 18, and/or perform one or more other actions.

At 308, the triggering module 204 may determine whether one or more enabling criteria for increasing the target line pressure 236 have been satisfied for the auto-stop event. For example, the triggering module 204 may determine whether the predetermined period has passed since the auto-stop signal 202 was generated and/or whether the engine speed 220 has become less than the predetermined speed. If 308 is true, the triggering module 204 generates the trigger signal 212 and control continues with 312. If 308 is false, control may remain at 308.

At 312, the maximum pressure module 224 determines the maximum line pressure 228. The maximum pressure module 224 may set the maximum line pressure 228 to a predetermined fixed pressure or determine the maximum line pressure 228, for example, based on the engine speed 220.

At 316, the target line pressure module 232 increases the target line pressure 236 to the maximum line pressure 228. The target line pressure module 232 may increase the target line pressure 236 toward/to the maximum line pressure 228 at a predetermined rate. At 320, as the target line pressure 236 increases, the regulator control module 240 adjusts the regulator valve 140 to decrease transmission fluid flow back to the sump 124, thereby increasing the line pressure 242. Additionally or alternatively, the pump control module 244 may increase an output of the transmission fluid pump 116 (in the case of a variable displacement transmission fluid pump) as the target line pressure 236 increases. Increasing the line pressure increases a torque load imposed on the engine 12 via the transmission 14 (and more particularly by the transmission fluid pump 116). This torque load helps slow the engine 12 to a stop. After the engine speed 220 reaches zero, the target line pressure module 232 may decrease the target line pressure 236 and resume its normal control of the target line pressure 236. While the example of FIG. 4 is shown as ending, FIG. 4 is specific to one auto-stop event and may be performed for other auto-stop events.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A vehicle control system, comprising:
a regulator valve that regulates pressure of transmission fluid applied to a clutch of a transmission and a flow rate of the transmission fluid from the regulator valve to a transmission fluid sump;
a transmission fluid pump that is driven by an engine of the vehicle, that draws the transmission fluid from the transmission fluid sump, and that pumps the transmission fluid to the regulator valve;
a control module that, while an ignition system of the vehicle is ON, selectively shuts down the engine of the vehicle for an auto-stop event;
a target pressure module that, before an engine speed reaches zero for the auto-stop event, increases a target value of a pressure of the transmission fluid at an output of the transmission fluid pump; and
a regulator control module that, before the engine speed reaches zero for the auto-stop event and based on the increase in the target value of the pressure, adjusts the regulator valve to decrease the flow rate of the transmission fluid from the regulator valve to the transmission fluid sump and increase the pressure of the transmission fluid at the output of the transmission fluid pump to the target value of the pressure.

2. The vehicle control system of claim 1 further comprising a maximum pressure module that sets a maximum pressure at the output of the transmission fluid pump for the auto-stop event,
wherein the target pressure module, before the engine speed reaches zero for the auto-stop event, increases the target value of the pressure to the maximum pressure.

3. The vehicle control system of claim 2 wherein the maximum pressure module determines the maximum pressure based on the engine speed.

4. The vehicle control system of claim 2 wherein the target pressure module increases the target value of the pressure toward the maximum pressure at a predetermined rate.

5. The vehicle control system of claim 1 wherein the target pressure module begins increasing the target value of the pressure after receiving a signal indicative of the auto-stop event from the control module.

6. The vehicle control system of claim 5 wherein the target pressure module begins increasing the target value of the pressure when a predetermined condition is satisfied after receiving the signal indicative of the auto-stop event from the control module.

7. The vehicle control system of claim 5 wherein the target pressure module begins increasing the target value of the pressure a predetermined period after receiving the signal indicative of the auto-stop event from the control module.

8. The vehicle control system of claim 5 wherein the target pressure module begins increasing the target value of the pressure when the engine speed becomes less than a predetermined speed after receiving the signal indicative of the auto-stop event from the control module.

9. The vehicle control system of claim 1 further comprising a pump control module that increases an output of the transmission fluid pump based on the increase in the target value of the pressure.

10. The vehicle control system of claim 9 wherein the pump control module increases a displacement of the transmission fluid pump based on the increase in the target value of the pressure.

11. A vehicle control method, comprising:
regulating pressure of transmission fluid applied to a clutch of a transmission and a flow rate of the transmission fluid from a regulator valve to a transmission fluid sump;
using a transmission fluid pump that is driven by an engine of the vehicle:
drawing the transmission fluid from the transmission fluid sump; and
pumping the transmission fluid to the regulator valve;
while an ignition system of the vehicle is ON, selectively shutting down the engine of the vehicle for an auto-stop event;
before an engine speed reaches zero for the auto-stop event, increasing a target value of a pressure of the transmission fluid at an output of the transmission fluid pump; and
before the engine speed reaches zero for the auto-stop event and based on the increase in the target value of the pressure, adjusting the regulator valve to:
decrease the flow rate of the transmission fluid from the regulator valve to the transmission fluid sump; and
increase the pressure of the transmission fluid at the output of the transmission fluid pump to the target value of the pressure.

12. The vehicle control method of claim 11 further comprising:
setting a maximum pressure at the output of the transmission fluid pump for the auto-stop event; and
before the engine speed reaches zero for the auto-stop event, increasing the target value of the pressure to the maximum pressure.

13. The vehicle control method of claim 12 further comprising determining the maximum pressure based on the engine speed.

14. The vehicle control method of claim 12 further comprising increasing the target value of the pressure toward the maximum pressure at a predetermined rate.

15. The vehicle control method of claim 11 further comprising beginning to increase the target value of the pressure after receiving a signal indicative of the auto-stop event from a control module via a car area network (CAN) bus.

16. The vehicle control method of claim 15 further comprising beginning to increase the target value of the pressure when a predetermined condition is satisfied after receiving the signal indicative of the auto-stop event from the control module.

17. The vehicle control method of claim 15 further comprising beginning to increase the target value of the pressure a predetermined period after receiving the signal indicative of the auto-stop event from the control module.

18. The vehicle control method of claim 15 further comprising beginning to increase the target value of the pressure when the engine speed becomes less than a predetermined speed after receiving the signal indicative of the auto-stop event from the control module.

19. The vehicle control method of claim 11 further comprising increasing an output of the transmission fluid pump based on the increase in the target value of the pressure.

20. The vehicle control method of claim 11 further comprising increasing a displacement of the transmission fluid pump based on the increase in the target value of the pressure.

\* \* \* \* \*